US012755715B2

(12) United States Patent
Kasahara

(10) Patent No.: US 12,755,715 B2
(45) Date of Patent: Oct. 6, 2026

(54) DISPLAY DRIVER AND DISPLAY DEVICE

(71) Applicant: ROHM Co., Ltd., Kyoto (JP)

(72) Inventor: Kei Kasahara, Kyoto (JP)

(73) Assignee: ROHM Co., Ltd., Kyoto (JP)

( * ) Notice: Subject to any disclaimer, the term of this patent is extended or adjusted under 35 U.S.C. 154(b) by 0 days.

(21) Appl. No.: 19/256,182

(22) Filed: Jul. 1, 2025

(65) Prior Publication Data

US 2026/0018145 A1 Jan. 15, 2026

(30) Foreign Application Priority Data

Jul. 9, 2024 (JP) ................................ 2024-110125

(51) Int. Cl.
*G09G 3/36* (2006.01)
*G09G 3/3275* (2016.01)

(52) U.S. Cl.
CPC ......... *G09G 3/3688* (2013.01); *G09G 3/3275* (2013.01); *G09G 2310/027* (2013.01); *G09G 2310/0289* (2013.01); *G09G 2310/0291* (2013.01); *G09G 2310/0297* (2013.01); *G09G 2310/08* (2013.01); *G09G 2330/025* (2013.01)

(58) Field of Classification Search
None
See application file for complete search history.

(56) References Cited

U.S. PATENT DOCUMENTS 6,037,918 A * 3/2000 Hansen .................... G09G 3/22 345/74.1
2003/0071778 A1* 4/2003 Lee ...................... G09G 3/2011 345/98
2004/0125067 A1* 7/2004 Kim ..................... G09G 3/3696 345/98
2006/0077139 A1* 4/2006 Kwon .................. G09G 3/3283 345/76
2008/0100605 A1* 5/2008 Shirai .................. G09G 3/3688 345/206
2018/0075817 A1* 3/2018 Kim ..................... G09G 3/3688

FOREIGN PATENT DOCUMENTS

JP 2004301946 10/2004
JP 7367006 10/2023

* cited by examiner

*Primary Examiner* — Dorothy Harris
(74) *Attorney, Agent, or Firm* — JCIPRNET

(57) ABSTRACT

A display driver and a display device including the same include multiple circuit blocks, each of which generates a signal representing, through time division multiplexing, voltage values corresponding to brightness levels indicated by respective K pixel data pieces as a drive signal, and generates first to Qth pixel data signals representing the K pixel data pieces with Q signals by time division multiplexing at least one pair of pixel data pieces consisting of two data pieces from among the K pixel data pieces. Each of the circuit blocks converts the first to Qth pixel data signals into first to Qth gradation voltages, for each of horizontal scanning periods, generates a gradation voltage signal representing, through time division multiplexing, voltage values corresponding to the respective K pixel data pieces expressed by the first to Qth gradation voltages, and outputs a signal amplified from the gradation voltage signal as the drive signal.

5 Claims, 8 Drawing Sheets

DISPLAY DRIVER AND DISPLAY DEVICE

CROSS-REFERENCE TO RELATED APPLICATION

This application claims the priority benefits of Japanese application no. 2024-110125, filed on Jul. 9, 2024. The entirety of the above-mentioned patent application is hereby incorporated by reference herein and made a part of this specification.

BACKGROUND

Technical Field

The disclosure relates to a display driver and a display device that drive a display panel in response to an image signal.

Related Art

As a liquid crystal or organic EL display device, those having a display panel in which display cells are formed at each of intersection parts of multiple scan lines and multiple signal lines (hereinafter referred to as data lines), and a display driver that drives multiple data lines of the display panel are generally known.

The display driver includes a latch part that incorporates multiple pixel data pieces representing the brightness level of each of pixels based on an image signal in digital values, multiple level shifters that increase the signal level of each of the incorporated pixel data pieces to a high voltage, and multiple digital to analog (DA) converters that convert each of the high-voltage pixel data pieces into gradation voltages having analog voltage values. Furthermore, the display driver includes multiple output amplifiers that amplify multiple gradation voltages corresponding to each of the pixel data pieces and supply the gradation voltages to multiple data lines of the display panel (for example, see Patent Literature 1 (Japanese Patent Application Laid-Open No. 2004-301946)). That is, in such a display driver, level shifters, DA converters, and output amplifiers are provided in the same number as the data lines formed in the display panel.

Meanwhile, in recent years, high-definition imaging has been implemented even in liquid crystal or organic electroluminescence (EL) display devices mounted on portable information terminals such as smartphones, and accordingly, the data lines of the display panel have increased. Therefore, since output amplifiers are needed for the number of data lines, there was an issue that the display driver becomes larger. Thus, a display driver has been proposed that drives multiple data lines of the display panel one by one in a time division (referred to as time division driving) with one output amplifier (for example, see Patent Literature 2 (Japanese Patent No. 7367006)). In this way, the number of output amplifiers may be reduced to 1/n (n: number of time divisions), thereby enabling the circuit scale of the display driver to be reduced accordingly.

SUMMARY

However, even if the above-mentioned time division driving is adopted, the number of level shifters and DA converters included in the display driver increases in proportion to the number of increases in data lines of the display panel, so the circuit scale was unable to be significantly reduced.

In addition, due to the increase in level shifters and DA converters accompanying the higher definition of the display panel, the current consumption increases, and especially when the instantaneous current flowing through all level shifters and DA converters becomes large during high load, the power supply voltage might drop, leading to operation malfunction.

Therefore, the disclosure provides a display driver and a display device capable of achieving high-speed driving, reduction of the circuit scale, and reduction of current consumption without causing operation failure.

A display driver according to the disclosure is a display driver for driving a display panel including multiple data lines and a demultiplexer that receives one drive signal corresponding to K (K is an integer of 2 or more) data lines of the data lines for each of the K data lines, and sequentially supplies the one drive signal to each of the K data lines one by one for each of the K data lines. The display driver includes multiple circuit blocks, each of which receives multiple pixel data pieces corresponding to each of pixels based on an image signal, and each of which generates, for each of K pixel data pieces of the pixel data pieces, a signal representing voltage values corresponding to brightness levels indicated by the respective K pixel data pieces by time division multiplexing as the one drive signal. Each of the circuit blocks includes: a first multiplexer part that outputs first to Qth pixel data signals respectively representing the K pixel data pieces by Q (Q is an integer of 2 or more) signal lines fewer than the K pixel data pieces by time division multiplexing at least one pair of pixel data pieces consisting of two data pieces among the K pixel data pieces; a level shift part that generates first to Qth high voltage pixel data signals by level shifting amplitude of the respective first to Qth pixel data signals to a high voltage side; a digital analog conversion part that converts the first to Qth high voltage pixel data signals into first to Qth gradation voltages having voltage values corresponding to brightness levels the first to Qth high voltage pixel data signals respectively represent; a second multiplexer part that outputs, for each of horizontal scanning periods of the image signal, a gradation voltage signal representing, by time division multiplexing, the voltage values corresponding to the respective K pixel data pieces represented by the first to Qth gradation voltages; and an output amplifier part that outputs a signal amplified from the gradation voltage signal as the one drive signal.

In addition, a display device according to the disclosure includes a display panel including multiple data lines and a demultiplexer that receives one drive signal corresponding to K (K is an integer of 2 or more) data lines of the data lines for each of the K data lines, and sequentially supplies the one drive signal to each of the K data lines one by one for each of the K data lines, and a display driver for driving the display panel. The display driver includes multiple circuit blocks, each of which receives multiple pixel data pieces corresponding to each of pixels based on an image signal, and each of which generates, for each of K pixel data pieces of the pixel data pieces, a signal representing voltage values corresponding to brightness levels indicated by the respective K pixel data pieces by time division multiplexing as the one drive signal. Each of the circuit blocks includes: a first multiplexer part that outputs first to Qth pixel data signals respectively representing the K pixel data pieces by Q (Q is an integer of 2 or more) signal lines fewer than the K pixel data pieces by time division multiplexing at least one pair of pixel data pieces consisting of two data pieces among the K pixel data pieces; a level shift part that generates first to Qth high voltage pixel data signals by level shifting amplitude of the respective first to Qth pixel data signals to a high voltage side; a digital analog conversion part that converts the first to Qth high voltage pixel data signals into first to Qth gradation voltages having voltage values corresponding to brightness levels the first to Qth high voltage pixel data signals respectively represent; a second multiplexer part that outputs, for each of horizontal scanning periods of the image signal, a gradation voltage signal representing, by time division multiplexing, the voltage values corresponding to the respective K pixel data pieces; and an output amplifier part that outputs a signal amplified from the gradation voltage signal as the one drive signal.

DETAILED DESCRIPTION

Hereinafter, examples of the disclosure are described in detail with reference to the drawings.

Example 1

Figure 1:
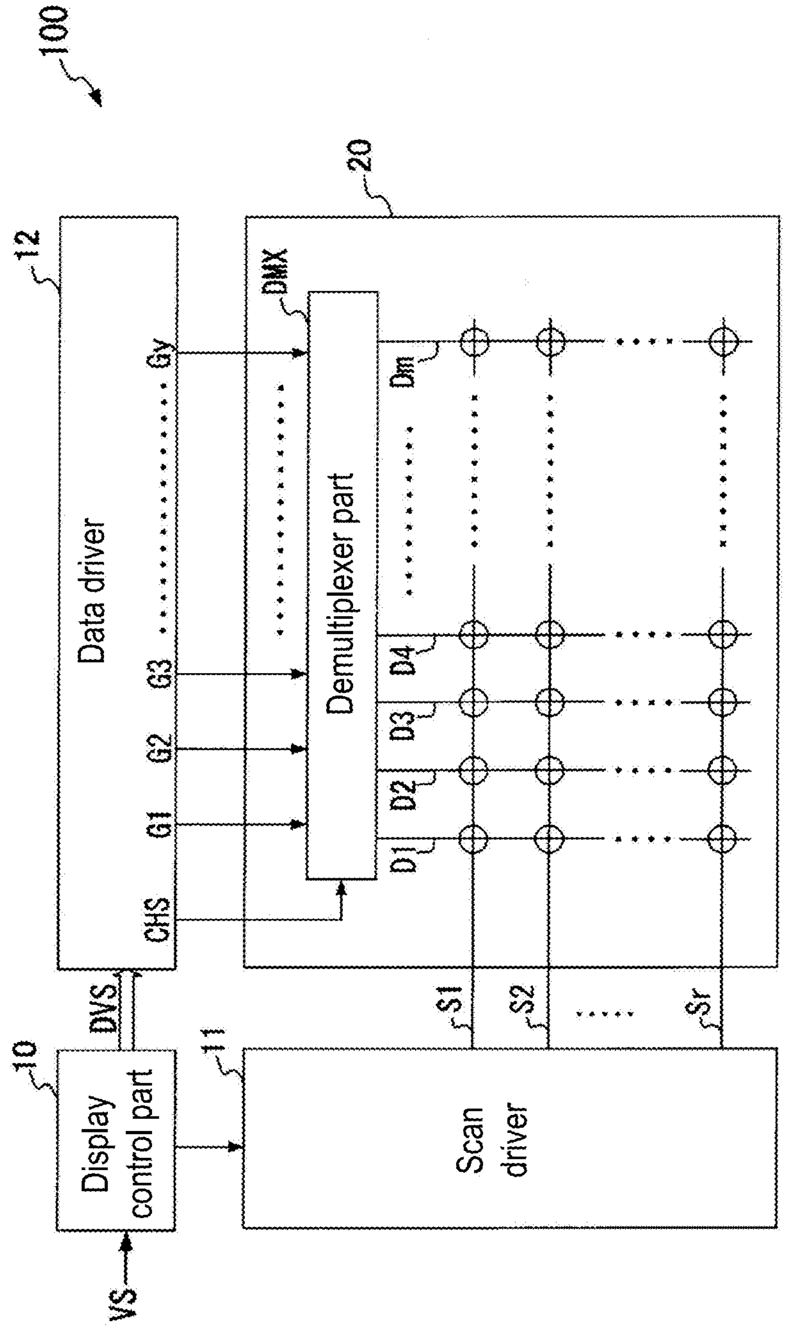
FIG. 1 is a block diagram showing a schematic configuration of a display device 100 including a display driver according to the disclosure.

FIG. 1 is a block diagram showing a schematic configuration of a display device 100 including a display driver according to the disclosure.

As shown in FIG. 1, the display device 100 includes a display control part 10, a scan driver 11, a data driver 12, and a display panel 20.

The display panel 20 is, for example, a time division driving type liquid crystal or organic EL display panel in which r (r is an integer of 2 or more) horizontal scan lines S1 to Sr extending in a horizontal direction of a two-dimensional screen, m (m is an integer of 2 or more) data lines D1 to Dm extending in a vertical direction of the two-dimensional screen, and a demultiplexer part DMX are disposed. In the regions of the intersection parts (regions enclosed by circles) of the horizontal scan lines and data lines included in the display panel 20, display cells for each of color components needed for color display, such as red display cells responsible for red color display, green display cells responsible for green color display, or blue display cells responsible for blue color display, are formed.

The demultiplexer part DMX receives an input switching signal CHS and drive signals G1 to Gy output from the data driver 12. Here, "y" is a positive integer expressed by $$y=m/K$$

m: total number of data lines

K: division number of time division driving (an integer of 3 or more).

The demultiplexer part DMX includes first to y-th demultiplexers (not shown), each of which is connected to one of the drive signals G1 to Gy and is connected to K data lines among the data lines D1 to Dm. Each of the first to y-th demultiplexers, in response to the input switching signal CHS, outputs one drive signal received by itself sequentially one by one to the K data lines connected to itself within one horizontal scanning period (hereinafter also referred to as 1H).

The display control part 10 receives an image signal VS that includes a horizontal synchronization signal and represents the brightness level of each of pixels. The display control part 10 generates, based on the image signal VS, an image digital signal DVS that includes various control signals such as a start pulse STA, a clock signal CLK, vertical and horizontal synchronization signals, and a series of pixel data pieces representing the brightness level of each of the pixels in, for example, 8 bits, and supplies the image digital signal DVS to the data driver 12.

Furthermore, the display control part 10 generates a scan timing signal indicating the timing for selecting scan lines in response to the horizontal synchronization signal included in the image signal VS, and supplies the scan timing signal to the scan driver 11.

The scan driver 11 generates scanning pulses in response to the scan timing signal supplied from the display control part 10, and applies the scanning pulses sequentially one by one to the horizontal scan lines S1 to Sr formed on the display panel 20.

The data driver 12 generates drive signals based on the image digital signal DVS by converting each of the pixel data pieces included in the image digital signal DVS into analog voltage values and amplifying the analog voltage values. The data driver 12 outputs the generated drive signals to the display panel 20 as drive signals G1 to Gy in groups of y (where y is an integer of 2 or more).

Furthermore, the data driver 12 outputs an input switching signal CHS to the display panel 20 for switching the data lines that are the input targets of the drive signals on the display panel 20 side.

Figure 2:
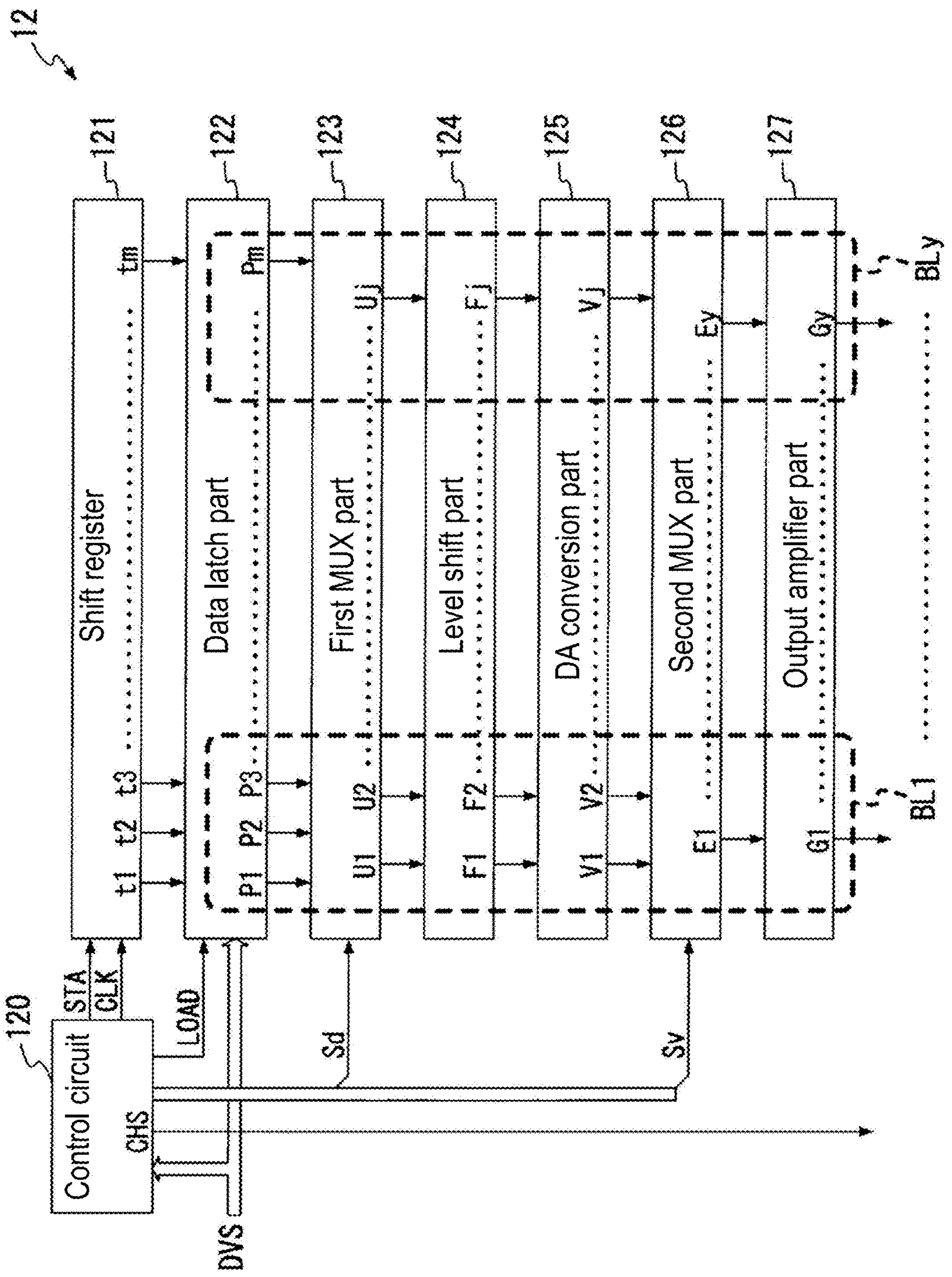
FIG. 2 is a block diagram showing an internal configuration of the data driver 12.

FIG. 2 is a block diagram showing the internal configuration of the data driver 12.

As shown in FIG. 2, the data driver 12 includes a control circuit 120, a shift register 121, a data latch part 122, a first multiplexer part (hereinafter referred to as a first MUX part) 123, a level shift part 124, a DA conversion part 125, a second multiplexer part (hereinafter referred to as a second MUX part) 126, and an output amplifier part 127.

The control circuit 120 receives the image digital signal DVS, extracts the start pulse STA and the clock signal CLK from the image digital signal DVS, and supplies the start pulse STA and the clock signal CLK to the shift register 121. In addition, the control circuit 120 supplies a load signal LOAD to the data latch part 122 to prompt data capture in response to the horizontal synchronization signal included in the image digital signal DVS. Furthermore, the control circuit 120 generates an input switching signal CHS for controlling the demultiplexer part DMX included in the display panel 20 in response to the horizontal synchronization signal, and outputs the input switching signal CHS to the data driver 12.

Furthermore, the control circuit 120 generates at least one selection control signal Sd and supplies the at least one selection control signal Sd to the first MUX part 123, and generates at least one selection control signal Sv and supplies the at least one selection control signal Sv to the second MUX part 126, in response to the above-mentioned horizontal synchronization signal.

The shift register 121 generates latch timing signals t1 to tm indicating the timing for latching each of the m data pieces in different sequential timings in synchronization with the clock signal CLK in response to the start pulse STA included in the image digital signal DVS. The shift register 121 supplies the latch timing signals t1 to tm to the data latch part 122.

The data latch part 122 sequentially latches each of pixel data pieces in the series of pixel data pieces included in the image digital signal DVS at the timing of the latch timing signals t1 to tm to hold m pixel data pieces, and outputs each of the pixel data pieces as pixel data P1 to Pm to the first MUX part 123 in response to the load signal LOAD.

The first MUX part 123 incorporates the pixel data P1 to Pm in groups of K, which is the division number of time division driving, time division multiplexes at least one pair of pixel data pieces among the K pixel data pieces within 1H in response to the selection control signal Sd, and outputs the pixel data pieces as one gradation voltage signal. As a result, the first MUX part 123 outputs the pixel data P1 to Pm, for each of the K pixel data pieces, as Q (Q is an integer of 2 or more) pixel data signals, which is fewer than the K pixel data pieces.

For example, when K is 3, the first MUX part 123 incorporates the pixel data P1 to Pm in groups of three pixel data pieces, and outputs the three pixel data pieces as two pixel data signals consisting of a first pixel data signal representing two of the three pixel data pieces by time division multiplexing and a second pixel data signal representing the remaining one.

Also, when K is 4, the first MUX part 123 incorporates the pixel data P1 to Pm in groups of four pixel data pieces, and outputs the four pixel data pieces as two pixel data signals consisting of a first pixel data signal representing two of the four pixel data pieces by time division multiplexing and a second pixel data signal representing the remaining two by time division multiplexing.

Also, when K is 6, the first MUX part 123 incorporates the pixel data P1 to Pm in groups of six pixel data pieces, and outputs the six pixel data pieces as three pixel data signals consisting of a first pixel data signal representing two of the six pixel data pieces by time division multiplexing, a second pixel data signal representing another two by time division multiplexing, and a third pixel data signal representing the remaining two by time division multiplexing.

By the operation described above, the first MUX part 123 converts m pixel data P1 to Pm supplied from the data latch part 122 into j (j is a positive integer expressed by m·Q/K) pixel data signals U1 to Uj and outputs the pixel data signals U1 to Uj to the level shift part 124.

The level shift part 124 outputs to the DA conversion part 125 high voltage pixel data signals F1 to Fj, which are obtained by level shifting the signal amplitude of each of the pixel data signals U1 to Uj to a high voltage side.

The DA conversion part 125 converts each of the high voltage pixel data signals F1 to Fj into gradation voltages V1 to Vj having voltage values corresponding to the brightness levels the high voltage pixel data signals F1 to Fj respectively represent, and outputs the gradation voltages V1 to Vj to the second MUX part 126.

The second MUX part 126 incorporates the gradation voltages V1 to Vj in groups of Q, and outputs the Q gradation voltages as one gradation voltage signal by time division multiplexing within 1H in response to the selection control signal Sv. As a result, the second MUX part 126 outputs j gradation voltages V1 to Vj supplied from the DA conversion part 125 as y gradation voltage signals E1 to Ey to the output amplifier part 127.

Incidentally, as described above, the total m of pixel data P1 to Pm, the total j of pixel data signals U1 to Uj, and the total y of gradation voltage signals E1 to Ey have the following magnitude relationship.

$$m>j>y$$

The output amplifier part 127 generates the drive signals G1 to Gy by individually amplifying the gradation voltage signals E1 to Ey and outputs the drive signals G1 to Gy to the display panel 20.

The internal configurations of the data latch part 122, the first MUX part 123, the level shift part 124, the DA conversion part 125, the second MUX part 126, and the output amplifier part 127 described above will be described below.

Incidentally, each of the drive signals G1 to Gy is individually generated for each of circuit blocks BL1 to BLy divided by the broken line regions shown in FIG. 2, extending across the data latch part 122, the first MUX part 123, the level shift part 124, the DA conversion part 125, the second MUX part 126, and the output amplifier part 127. In this case, although each of the circuit blocks BL1 to BLy differs in the pixel data pieces (P1 to Pm) that the data latch part 122 holds and outputs from the series of pixel data pieces included in the image digital signal DVS, the basic configuration is the same.

Therefore, below, the circuit block BL1 that generates the drive signal G1 is excerpted, and the internal configuration and operation are described in detail, divided into cases where the division number K in time division driving is 3, 4, and 6.

[in the Case of Division Number K=3]

Figure 3:
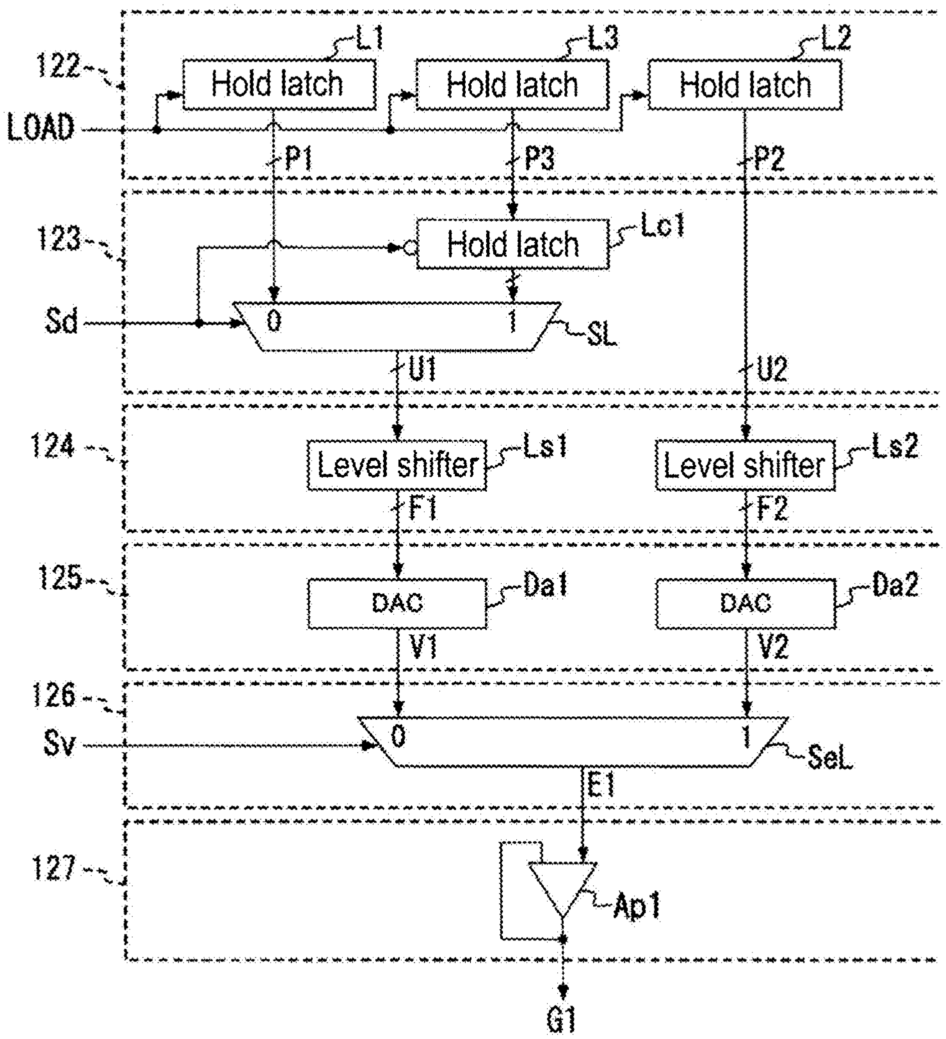
FIG. 3 is a block diagram showing an internal configuration of a circuit block BL1 in the case where a division number K is 3 in time division driving.

FIG. 3 is a block diagram showing the internal configuration of the circuit block BL1 in the case where the division number K is 3.

As shown in FIG. 3, the circuit block BL1 includes hold latches L1 to L3 included in the data latch part 122, a hold latch Lc1 and a data selector SL included in the first MUX part 123, level shifters Ls1 and Ls2 included in the level shift part 124, DA converters Da1 and Da2 included in the DA conversion part 125, a voltage selector SeL included in the second MUX part 126, and an amplifier Ap1 included in the output amplifier part 127.

The hold latches L1 to L3 of the data latch part 122 hold the pixel data P1 to P3, each consisting of, for example, 8 bits, from the series of pixel data pieces included in the image digital signal DVS, and output each to the first MUX part 123 in response to the load signal LOAD.

The hold latch Lc1 of the first MUX part 123 receives the binary (logic level 0 or 1) selection control signal Sd, incorporates and holds the pixel data P3 at the timing of the falling edge of the selection control signal Sd while supplying the pixel data P3 to the data selector SL. The data selector SL receives the pixel data P1 output from the hold latch L1 and the pixel data P3 supplied from the hold latch Lc1, as well as the selection control signal Sd. While the selection control signal Sd expresses logic level 0, the data selector SL selects the pixel data P1 output from the hold latch L1 and outputs the pixel data signal U1 expressing the pixel data P1 to the level shift part 124. On the other hand, while the selection control signal Sd expresses logic level 1, the data selector SL selects the pixel data P3 supplied from the hold latch Lc1 and outputs the pixel data signal U1 expressing the pixel data P3 to the level shift part 124.

Furthermore, the first MUX part 123 receives the pixel data P2 output from the hold latch L2 and outputs the pixel data signal U2 expressing the pixel data P2 to the level shift part 124.

The level shifter Ls1 of the level shift part 124 outputs a high voltage pixel data signal F1 to the DA conversion part 125, which is the signal amplitude of the pixel data signal U1 level-shifted to a high voltage side. The level shifter Ls2 outputs the signal amplitude of the pixel data signal U2 level-shifted to a high voltage side as the high voltage pixel data signal F2 to the DA conversion part 125.

The DA converter Da1 of the DA conversion part 125 converts the high voltage pixel data signal F1 into a gradation voltage V1 having a voltage value corresponding to the brightness level indicated by the high voltage pixel data signal F1 and outputs the gradation voltage V1 to the second MUX part 126. The DA converter Da2 converts the high voltage pixel data signal F2 into a gradation voltage V2 having a voltage value corresponding to the brightness level indicated by the high voltage pixel data signal F2 and outputs the gradation voltage V2 to the second MUX part 126.

The voltage selector SeL of the second MUX part 126 receives the gradation voltages V1 and V2 described above, as well as the selection control signal Sv. While the selection control signal Sv represents logic level 0, the voltage selector SeL selects the gradation voltage V1 and outputs the gradation voltage V1 as the gradation voltage signal E1 to the output amplifier part 127. On the other hand, while the selection control signal Sv represents logic level 1, the voltage selector SeL selects the gradation voltage V2 and outputs the gradation voltage V2 as the gradation voltage signal E1 to the output amplifier part 127.

The amplifier Ap1 of the output amplifier part 127 is, for example, an operational amplifier with a voltage follower configuration, and outputs a signal amplified from the gradation voltage signal E1 as the drive signal G1.

Figure 4:
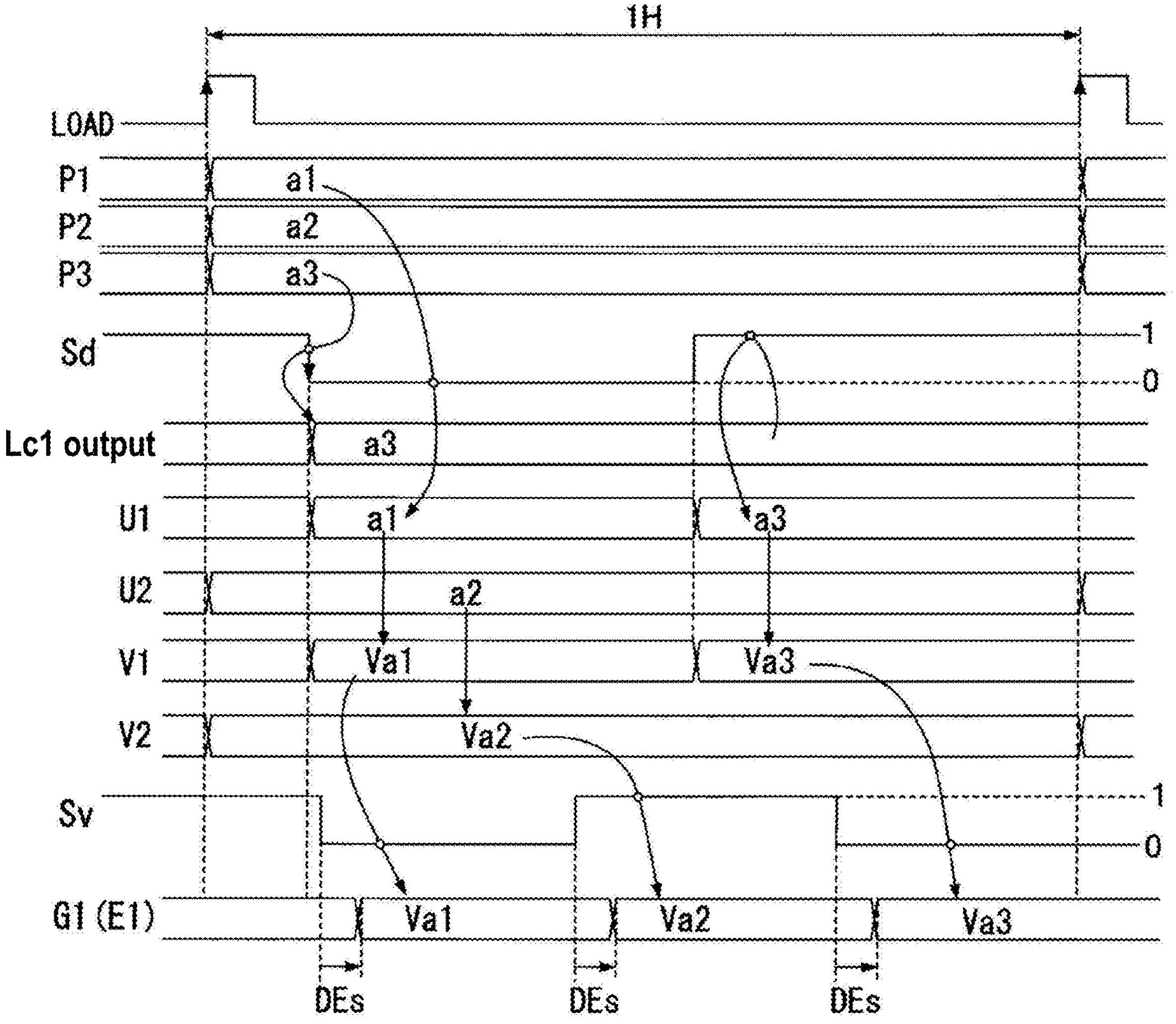
FIG. 4 is a time chart showing an example of the internal operation of the circuit block BL1 consisting of the configuration (K=3) shown in FIG. 3.

FIG. 4 is a time chart showing an example of the internal operation of the circuit block BL1 consisting of the configuration (K=3) shown in FIG. 3.

First, in response to the load signal LOAD in which a single pulse appears every 1H, the hold latches L1 to L3 output, as shown in FIG. 4, pixel data P1 indicating a brightness level a1, pixel data P2 representing a brightness level a2, and pixel data P3 indicating a brightness level a3.

Here, in response to the load signal LOAD, as shown in FIG. 4, the control circuit 120 supplies to the first MUX part 123 a binary selection control signal Sd which transitions from a logic level 1 state to logic level 0 at a predetermined starting point within 1H, maintains the logic level 0 state for a predetermined period (for example, 1H/2), and then transitions to logic level 1.

The hold latch Lc1, at the timing of the falling edge of the selection control signal Sd, incorporates and holds the pixel data P3 indicating a brightness level a3 while supplying the pixel data P3 to the data selector SL.

The data selector SL, while the selection control signal Sd is in the logic level 0 state, selects P1 from among the pixel data P1 and the pixel data P3, and supplies to the level shifter Ls1 a pixel data signal U1 indicating the brightness level a1 indicated by the pixel data P1. On the other hand, while the selection control signal Sd is at logic level 1, the data selector SL selects the pixel data P3 and supplies to the level shifter Ls1 the pixel data signal U1 indicating the brightness level a3 indicated by the pixel data P3. The level shifter Ls2 receives a pixel data signal U2 indicating the brightness level a2 indicated by the pixel data P2.

Here, the level shifter Ls1 and the DA converter Da1 output a gradation voltage V1 having a voltage value Va1 corresponding to the brightness level a1 while the pixel data signal U1 expresses the brightness level a1. On the other hand, while the pixel data signal U1 expresses the brightness level a3, the level shifter Ls1 and the DA converter Da1 output a gradation voltage V1 having a voltage value Va3 corresponding to the brightness level a3. The level shifter Ls2 and the DA converter Da2 output a gradation voltage V2 having a voltage value Va2 corresponding to the brightness level a2 indicated by the pixel data signal U2.

Here, in response to the load signal LOAD, as shown in FIG. 4, the control circuit 120 transitions from the logic level 1 state to logic level 0 and subsequently supplies to the voltage selector SeL a binary selection control signal Sv which inverts a logic level thereof for each of intervals divided into three sections for the remaining period within 1H.

Therefore, the voltage selector SeL and the amplifier Ap1, in the first interval at the beginning of 1H, output a drive signal G1 having a voltage value Va1 indicated by the gradation voltage V1 in response to the selection control signal Sv representing logic level 0. Also, in the second interval of the next, the voltage selector SeL and the amplifier Ap1 output a drive signal G1 having a voltage value Va2 indicated by the gradation voltage V2 in response to the selection control signal Sv of logic level 1. Then, in the third interval of the next, the voltage selector SeL and the amplifier Ap1 output a drive signal G1 having a voltage value Va3 indicated by the gradation voltage V1 in response to the selection control signal Sv of logic level 0.

In this manner, the circuit block BL1 generates a drive signal G1 that transmits the voltage values Va1 to Va3 corresponding respectively to the three pixel data P1 to P3 included in the image digital signal DVS by time division multiplexing within 1H, and outputs the drive signal G1 to the display panel 20.

In this case, according to the configuration shown in FIG. 3, the output delay time of each of the voltage values Va1 to Va3 expressed by the drive signal G1 is, as shown in FIG. 4, merely delay time DEs after the time spent on the operation of the voltage selector SeL and the amplifier Ap1 from the rising or falling edge of the selection control signal Sv, thus enabling high-speed driving.

Furthermore, in the configuration shown in FIG. 3, although the hold latch Lc1 and the data selector SL are added for time division multiplexing of the three pixel data P1 to P3, the number of level shifters and DA converters that are originally needed is reduced from three to two (Ls1, Ls2, Da1, Da2) respectively.

Therefore, the circuit scale of the entire data driver 12 is significantly reduced compared to the display driver described in Patent Literature 2, and the current consumption is also significantly reduced accordingly. Furthermore, according to the configuration shown in FIG. 3, the total number of level shifters and the total number of DA converters are both reduced to ⅔ of the number conventionally needed. Therefore, since the instantaneous current flowing due to the simultaneous operation of the level shifters and DA converters is also significantly reduced, malfunctions associated with power supply voltage drops may be eliminated.

[In the Case of Division Number K=4]

Figure 5:
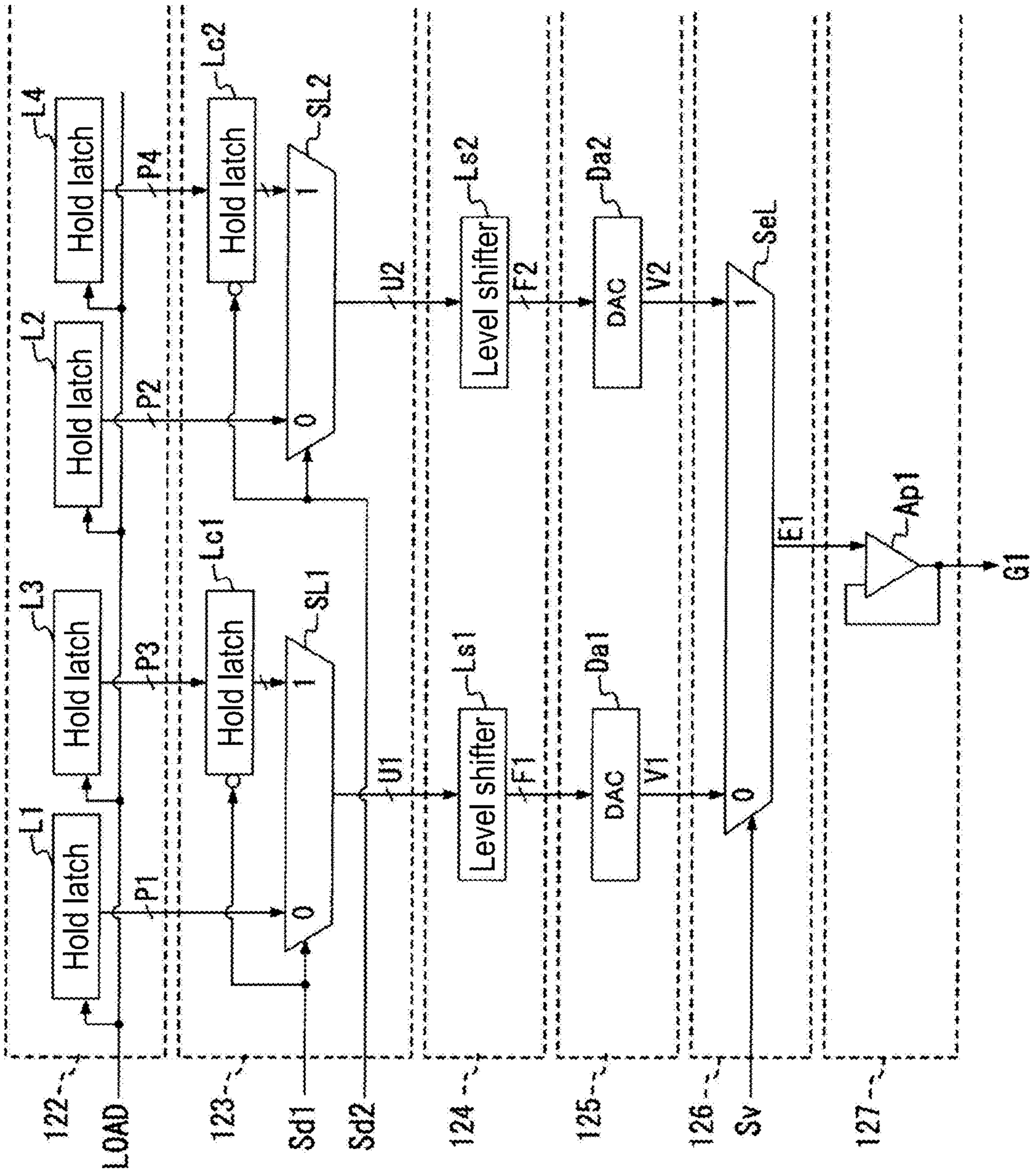
FIG. 5 is a block diagram showing the internal configuration of the circuit block BL1 in the case where the division number K is 4 in time division driving.

FIG. 5 is a block diagram showing the internal configuration of the circuit block BL1 in the case where the division number K is 4.

In the configuration shown in FIG. 5, the data latch part 122 includes hold latches L1 to L4, and the first MUX part 123 includes hold latches Lc1 and Lc2 and data selectors SL1 and SL2. In FIG. 5, since the internal configurations of the level shift part 124, DA conversion part 125, second MUX part 126, and output amplifier part 127 are the same as those shown in FIG. 3, descriptions thereof are omitted.

The hold latches L1 to L4 of the data latch part 122 hold pixel data P1 to P4, each consisting of, for example, 8 bits, from the series of pixel data pieces included in the image digital signal DVS, and output each to the first MUX part 123 in response to the load signal LOAD.

The hold latch Lc1 of the first MUX part 123 receives a binary (logic level 0 or 1) selection control signal Sd1, incorporates and holds the pixel data P3 at the timing of the falling edge of the selection control signal Sd1 while supplying the pixel data P3 to the data selector SL1. The data selector SL1 receives the pixel data P1 output from the hold latch L1 and the pixel data P3 supplied from the hold latch Lc1, as well as the selection control signal Sd1. While the selection control signal Sd1 expresses logic level 0, the data selector SL1 selects the pixel data P1 output from the hold latch L1 and outputs a pixel data signal U1 expressing the pixel data P1 to the level shift part 124. On the other hand, while the selection control signal Sd1 expresses logic level 1, the data selector SL1 selects the pixel data P3 supplied from the hold latch Lc1 and outputs a pixel data signal U1 expressing the pixel data P3 to the level shift part 124.

The hold latch Lc2 of the first MUX part 123 receives a binary (logic level 0 or 1) selection control signal Sd2, incorporates and holds the pixel data P4 at the timing of the falling edge of the selection control signal Sd2 while supplying the pixel data P4 to the data selector SL2. The data selector SL2 receives the pixel data P2 output from the hold latch L2 and the pixel data P4 supplied from the hold latch Lc2, as well as the selection control signal Sd2. While the selection control signal Sd2 expresses logic level 0, the data selector SL2 selects the pixel data P2 output from the hold latch L2 and outputs a pixel data signal U2 expressing the pixel data P2 to the level shift part 124. On the other hand, while the selection control signal Sd2 expresses logic level 1, the data selector SL2 selects the pixel data P4 supplied from the hold latch Lc2 and outputs a pixel data signal U2 expressing the pixel data P4 to the level shift part 124.

Figure 6:
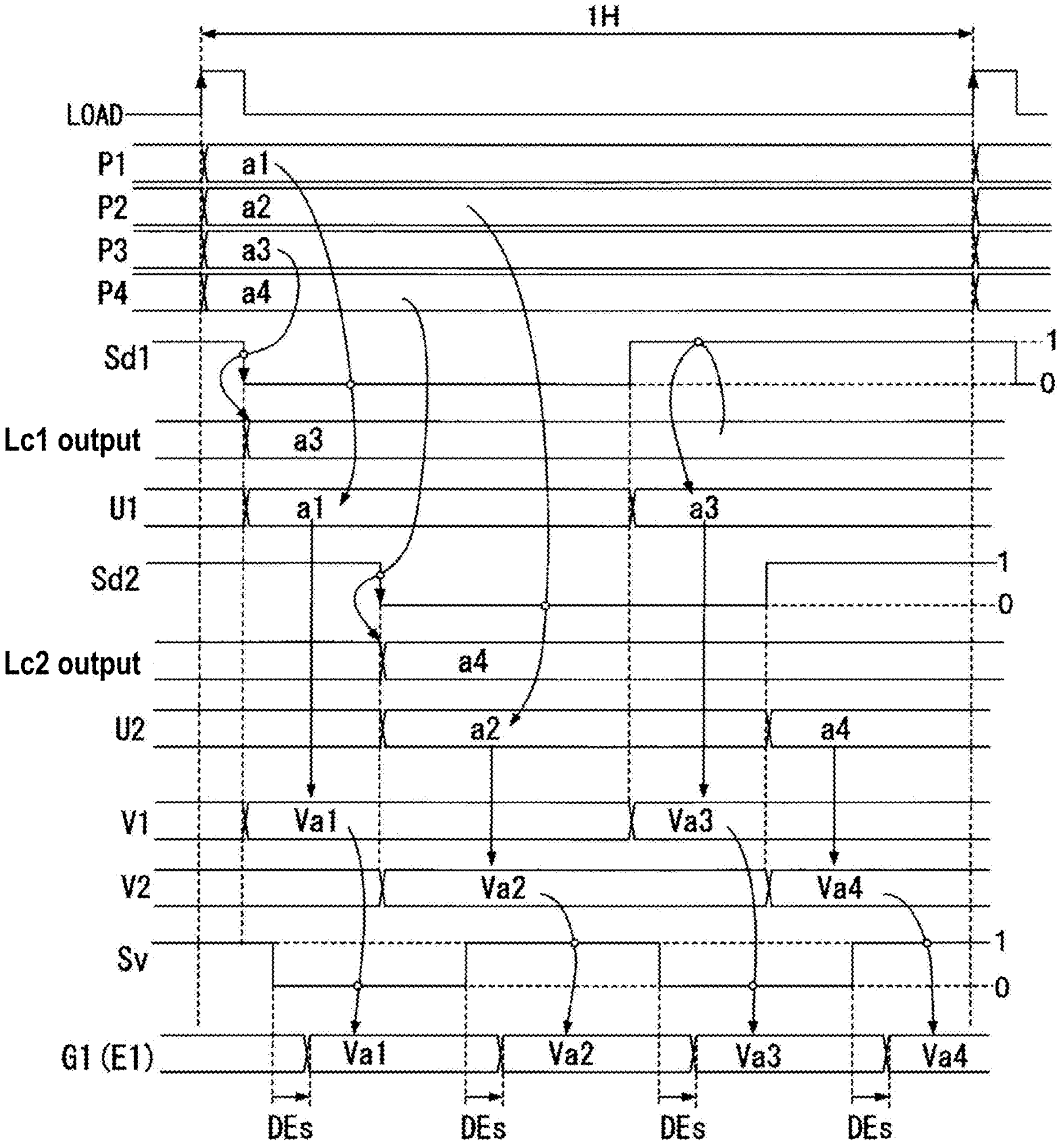
FIG. 6 is a time chart showing an example of the internal operation of the circuit block BL1 consisting of the configuration (K=4) shown in FIG. 5.

FIG. 6 is a time chart showing an example of the internal operation of the circuit block BL1 consisting of the configuration (K=4) shown in FIG. 5.

First, in response to the load signal LOAD in which a single pulse appears every 1H, the hold latches L1 to L4 output, as shown in FIG. 6, pixel data P1 to P4 showing brightness levels a1 to a4 respectively.

Here, in response to the load signal LOAD, as shown in FIG. 6, the control circuit 120 generates a binary selection control signal Sd1 which transitions from a logic level 1 state to logic level 0 at a predetermined starting point within 1H, maintains the logic level 0 state for a predetermined period (for example, 1H/2), and then transitions to logic level 1. Furthermore, the control circuit 120 generates a binary selection control signal Sd2 which transitions from a logic level 1 state to logic level 0 at a point later than the starting point, for example, by a time of (1H/4), maintains the logic level 0 state for a predetermined period (for example, 1H/2), and then transitions to logic level 1. Then, the control circuit 120 supplies the generated selection control signals Sd1 and Sd2 to the first MUX part 123.

The hold latch Lc1, at the timing of the falling edge of the selection control signal Sd1, incorporates and holds the pixel data P3 indicating the brightness level a3 while supplying the pixel data P3 to the data selector SL1.

The data selector SL1, while the selection control signal Sd1 is in the logic level 0 state, selects P1 from among the pixel data P1 and P3, and supplies to the level shifter Ls1 the pixel data signal U1 indicating the brightness level a1 indicated by the pixel data P1. On the other hand, while the selection control signal Sd1 is at logic level 1, the data selector SL1 selects the pixel data P3 and supplies to the level shifter Ls1 the pixel data signal U1 indicating the brightness level a3 indicated by the pixel data P3.

The hold latch Lc2, at the timing of the falling edge of the selection control signal Sd2, incorporates and holds the pixel data P4 indicating the brightness level a4 while supplying the pixel data P4 to the data selector SL2.

The data selector SL2, while the selection control signal Sd2 is in the logic level 0 state, selects P2 from among the pixel data P2 and P4, and supplies to the level shifter Ls2 the pixel data signal U2 indicating the brightness level a2 indicated by the pixel data P2. On the other hand, while the selection control signal Sd2 is at logic level 1, the data selector SL2 selects the pixel data P4 and supplies to the level shifter Ls2 the pixel data signal U2 indicating the brightness level a4 indicated by the pixel data P4.

Here, the level shifter Ls1 and the DA converter Da1 output a gradation voltage V1 having a voltage value Va1 corresponding to the brightness level a1 while the pixel data signal U1 expresses the brightness level a1. On the other hand, while the pixel data signal U1 expresses the brightness level a3, the level shifter Ls1 and the DA converter Da1 output a gradation voltage V1 having a voltage value Va3 corresponding to the brightness level a3.

Also, the level shifter Ls2 and the DA converter Da2 output a gradation voltage V2 having a voltage value Va2 corresponding to the brightness level a2 while the pixel data signal U2 expresses the brightness level a2. On the other hand, while the pixel data signal U2 expresses the brightness level a4, the level shifter Ls2 and the DA converter Da2 output a gradation voltage V2 having a voltage value Va4 corresponding to the brightness level a4.

Here, in response to the load signal LOAD, as shown in FIG. 6, the control circuit 120 transitions from the logic level 1 state to logic level 0 and subsequently supplies to the voltage selector SeL a binary selection control signal Sv which inverts a logic level thereof for each of intervals divided into four sections for the remaining period within 1H.

Therefore, the voltage selector SeL and the amplifier Ap1, in the first interval at the beginning of 1H, output a drive signal G1 having a voltage value Va1 indicated by the gradation voltage V1 in response to the selection control signal Sv representing logic level 0. Also, in the second interval of the next, the voltage selector SeL and the amplifier Ap1 output a drive signal G1 having a voltage value Va2 indicated by the gradation voltage V2 in response to the selection control signal Sv representing logic level 1. Subsequently, in the third interval, the voltage selector SeL and the amplifier Ap1 output a drive signal G1 having a voltage value Va3 indicated by the gradation voltage V1 in response to the selection control signal Sv representing logic level 0. Then, in the fourth interval, the voltage selector SeL and the amplifier Ap1 output a drive signal G1 having a voltage value Va4 indicated by the gradation voltage V2 in response to the selection control signal Sv of logic level 1.

In this way, the circuit block BL1 consisting of the configuration (K=4) shown in FIG. 5 generates a drive signal G1 that transmits the voltage values Va1 to Va4 corresponding respectively to the four pixel data P1 to P4 included in the image digital signal DVS by time division multiplexing within 1H, and outputs the drive signal G1 to the display panel 20.

In this case, according to the configuration shown in FIG. 5, the output delay time of each of the voltage values Va1 to Va4 expressed by the drive signal G1 becomes, as shown in FIG. 6, delay time DEs after the time spent on the operation of the voltage selector SeL and the amplifier Ap1 from the rising or falling edge of the selection control signal Sv, thus enabling high-speed driving.

Furthermore, in the configuration shown in FIG. 5, although the hold latches Lc1 and Lc2 and the data selectors SL1 and SL2 are added for time division multiplexing of the four pixel data P1 to P4, the number of level shifters and DA converters that are originally needed is reduced from four to two (Ls1, Ls2, Da1, Da2) respectively.

Therefore, the circuit scale of the entire data driver 12 is significantly reduced compared to the display driver described in Patent Literature 2, and the current consumption is also significantly reduced accordingly. Furthermore, according to the configuration shown in FIG. 5, the total number of level shifters and the total number of DA converters are both reduced to ½ of the number conventionally needed. Therefore, since the instantaneous current flowing due to the simultaneous operation of the level shifters and DA converters is also significantly reduced, malfunctions associated with power supply voltage drops may be eliminated.

[In the Case of Division Number K=6]

Figure 7:
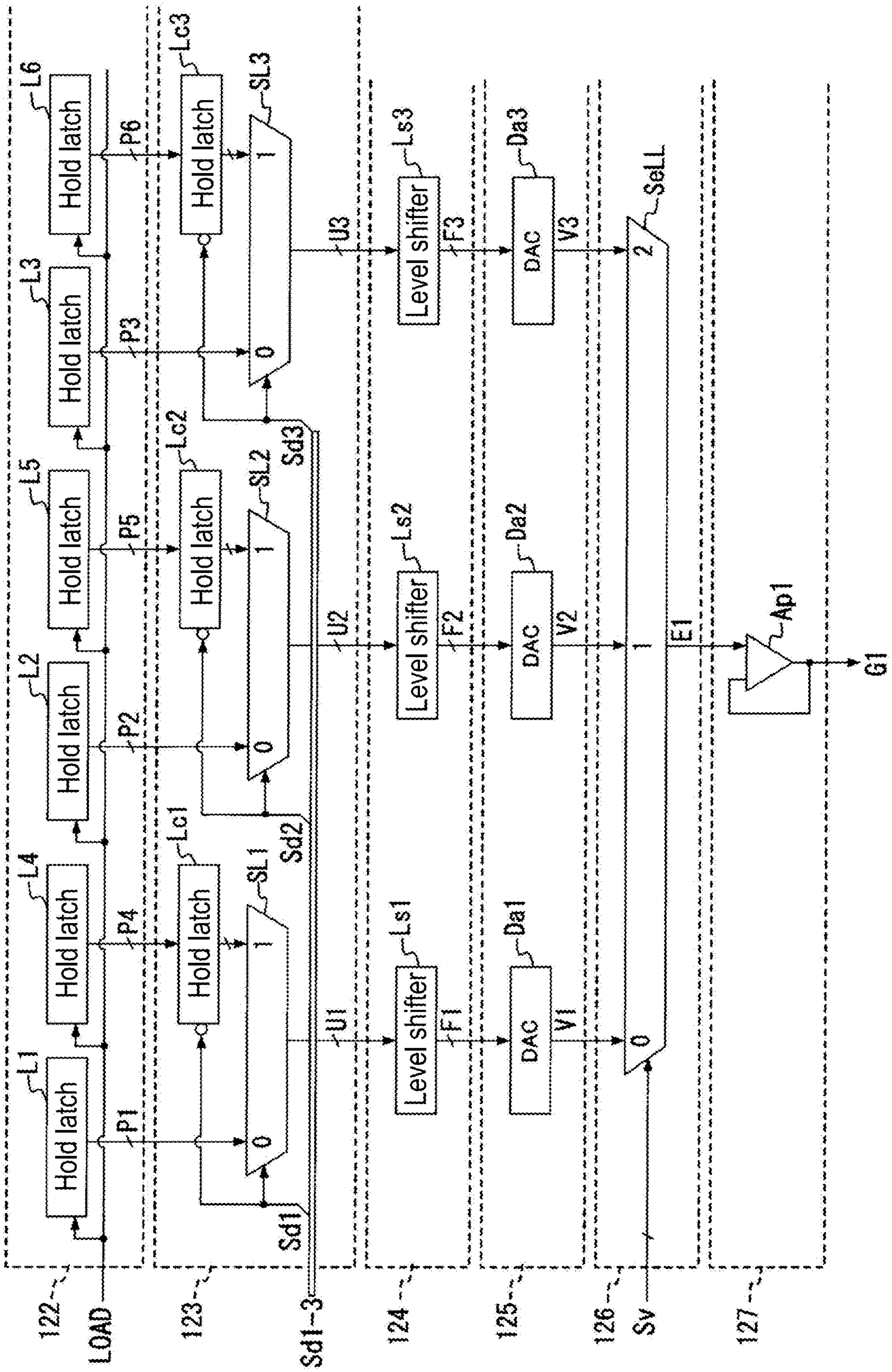
FIG. 7 is a block diagram showing the internal configuration of the circuit block BL1 in the case where the division number K is 6 in time division driving.

FIG. 7 is a block diagram showing the internal configuration of the circuit block BL1 in the case where the division number K is 6.

In the configuration shown in FIG. 7, the data latch part 122 includes hold latches L1 to L6, and the first MUX part 123 includes hold latches Lc1 to Lc3 and data selectors SL1 to SL3. Also, the level shift part 124 includes level shifters Ls1 to Ls3, the DA conversion part 125 includes DA converters Da1 to Da3, the second MUX part 126 includes a voltage selector SeLL, and the output amplifier part 127 includes an amplifier Ap1.

The hold latches L1 to L6 of the data latch part 122 hold pixel data P1 to P6, each consisting of, for example, 8 bits, from the series of pixel data pieces included in the image digital signal DVS, and output each to the first MUX part 123 in response to the load signal LOAD.

The hold latch Lc1 of the first MUX part 123 receives a binary (logic level 0 or 1) selection control signal Sd1, incorporates and holds the pixel data P4 at the timing of the falling edge of the selection control signal Sd1 while supplying the pixel data P4 to the data selector SL1. The data selector SL1 receives the pixel data P1 output from the hold latch L1 and the pixel data P4 supplied from the hold latch Lc1, as well as the selection control signal Sd1. While the selection control signal Sd1 expresses logic level 0, the data selector SL1 selects the pixel data P1 output from the hold latch L1 and outputs a pixel data signal U1 expressing the pixel data P1 to the level shift part 124. On the other hand, while the selection control signal Sd1 expresses logic level 1, the data selector SL1 selects the pixel data P4 supplied from the hold latch Lc1 and outputs a pixel data signal U1 expressing the pixel data P4 to the level shift part 124.

The hold latch Lc2 of the first MUX part 123 receives a binary (logic level 0 or 1) selection control signal Sd2, incorporates and holds the pixel data P5 at the timing of the falling edge of the selection control signal Sd2 while supplying the pixel data P5 to the data selector SL2. The data selector SL2 receives the pixel data P2 output from the hold latch L2 and the pixel data P5 supplied from the hold latch Lc2, as well as the selection control signal Sd2. While the selection control signal Sd2 expresses logic level 0, the data selector SL2 selects the pixel data P2 output from the hold latch L2 and outputs a pixel data signal U2 expressing the pixel data P2 to the level shift part 124. On the other hand, while the selection control signal Sd2 expresses logic level 1, the data selector SL2 selects the pixel data P5 supplied from the hold latch Lc2 and outputs a pixel data signal U2 expressing the pixel data P5 to the level shift part 124.

The hold latch Lc3 of the first MUX part 123 receives a binary (logic level 0 or 1) selection control signal Sd3, incorporates and holds the pixel data P6 at the timing of the falling edge of the selection control signal Sd3 while supplying the pixel data P6 to the data selector SL3. The data selector SL3 receives the pixel data P3 output from the hold latch L3 and the pixel data P6 supplied from the hold latch Lc3, as well as the selection control signal Sd3. While the selection control signal Sd3 expresses logic level 0, the data selector SL3 selects the pixel data P3 output from the hold latch L3 and outputs a pixel data signal U3 expressing the pixel data P3 to the level shift part 124. On the other hand, while the selection control signal Sd3 expresses logic level 1, the data selector SL3 selects the pixel data P6 supplied from the hold latch Lc3 and outputs a pixel data signal U3 expressing the pixel data P6 to the level shift part 124.

The level shifters Ls1 to Ls3 of the level shift part 124 output high voltage pixel data signals F1 to F3 to the DA conversion part 125, which are the signal amplitudes of the respective pixel data signals U1 to U3 level-shifted to a high voltage side.

The DA converters Da1 to Da3 of the DA conversion part 125 convert the high voltage pixel data signals F1 to F3 into gradation voltages V1 to V3 having voltage values corresponding to the brightness levels indicated by the respective high voltage pixel data signals F1 to F3, and output the gradation voltages V1 to V3 to the second MUX part 126.

The voltage selector SeLL of the second MUX part 126 receives the above-mentioned three systems of gradation voltages V1 to V3, as well as a selection control signal Sv representing three values: “0”, “1”, or “2”.

While the selection control signal Sv represents “0”, the voltage selector SeLL selects the gradation voltage V1 and outputs the gradation voltage V1 as the gradation voltage signal E1 to the output amplifier part 127. Also, while the selection control signal Sv represents “1”, the voltage selector SeLL selects the gradation voltage V2 and outputs the gradation voltage V2 as the gradation voltage signal E1 to the output amplifier part 127. Moreover, while the selection control signal Sv represents “2”, the voltage selector SeLL selects the gradation voltage V3 and outputs the gradation voltage V3 as the gradation voltage signal E1 to the output amplifier part 127.

The amplifier Ap1 of the output amplifier part 127 is, for example, an operational amplifier with a voltage follower configuration, and outputs a signal amplified from the gradation voltage signal E1 as the drive signal G1.

Figure 8:
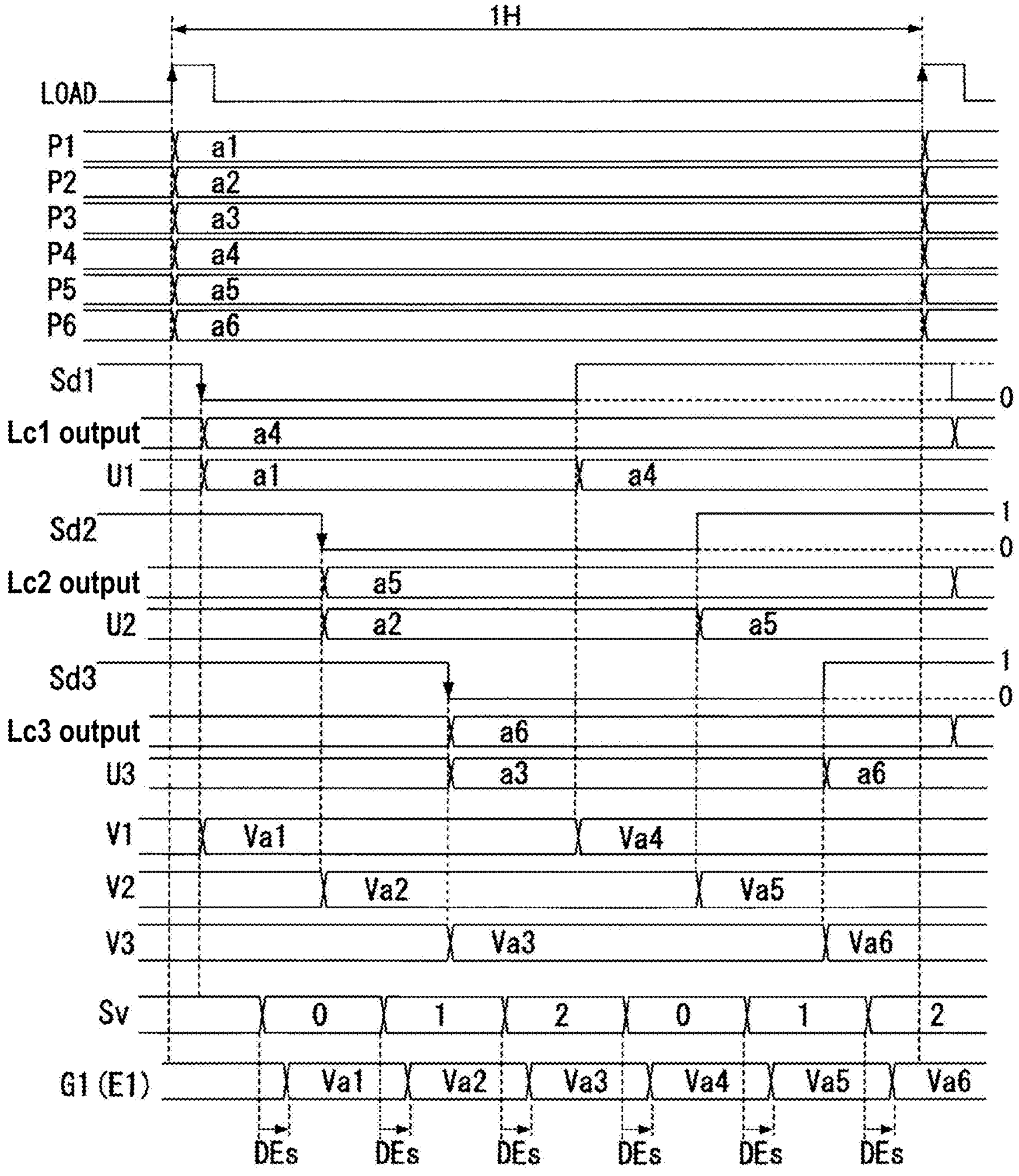
FIG. 8 is a time chart showing an example of the internal operation of the circuit block BL1 consisting of the configuration (K=6) shown in FIG. 7.

FIG. 8 is a time chart showing an example of the internal operation of the circuit block BL1 consisting of the configuration (K=6) shown in FIG. 7.

First, in response to the load signal LOAD, the hold latches L1 to L6 output, as shown in FIG. 8, pixel data P1 to P6 showing brightness levels a1 to a6 respectively.

Here, in response to the load signal LOAD, as shown in FIG. 8, the control circuit 120 generates a binary selection control signal Sd1 which transitions from a logic level 1 state to logic level 0 at a predetermined starting point (first point) within 1H, maintains the logic level 0 state for a predetermined period (for example, 1H/2), and then transitions to logic level 1. Also, the control circuit 120 generates a binary selection control signal Sd2 which transitions from a logic level 1 state to logic level 0 at a second point that is later than the first point, for example, by a time of (1H/6), maintains the logic level 0 state for a predetermined period (for example, 1H/2), and then transitions to logic level 1. Furthermore, the control circuit 120 generates a binary selection control signal Sd3 which transitions from a logic level 1 state to logic level 0 at a third point that is later than the second point, for example, by a time of (1H/6), maintains the logic level 0 state for a predetermined period (for example, 1H/2), and then transitions to logic level 1. Then, the control circuit 120 supplies the generated selection control signals Sd1 to Sd3 to the first MUX part 123.

The hold latch Lc1, at the timing of the falling edge of the selection control signal Sd1, incorporates and holds the pixel data P4 indicating the brightness level a4 while supplying the pixel data P4 to the data selector SL1.

The data selector SL1, while the selection control signal Sd1 is in the logic level 0 state, selects P1 from among the pixel data P1 and P4, and supplies to the level shifter Ls1 the pixel data signal U1 indicating the brightness level a1 indicated by the pixel data P1. On the other hand, while the selection control signal Sd1 is at logic level 1, the data selector SL1 selects the pixel data P4 and supplies to the level shifter Ls1 the pixel data signal U1 indicating the brightness level a4 indicated by the pixel data P4.

The hold latch Lc2, at the timing of the falling edge of the selection control signal Sd2, incorporates and holds the pixel data P5 indicating the brightness level a5 while supplying the pixel data P5 to the data selector SL2.

The data selector SL2, while the selection control signal Sd2 is in the logic level 0 state, selects P2 from among the pixel data P2 and P5, and supplies to the level shifter Ls2 the pixel data signal U2 indicating the brightness level a2 indicated by the pixel data P2. On the other hand, while the selection control signal Sd2 is at logic level 1, the data selector SL2 selects the pixel data P5 and supplies to the level shifter Ls2 the pixel data signal U2 indicating the brightness level a5 indicated by the pixel data P5.

The hold latch Lc3, at the timing of the falling edge of the selection control signal Sd3, incorporates and holds the pixel data P6 indicating the brightness level a6 while supplying the pixel data P6 to the data selector SL3.

The data selector SL3, while the selection control signal Sd3 is in the logic level 0 state, selects P3 from among the pixel data P3 and P6, and supplies to the level shifter Ls3 the pixel data signal U3 indicating the brightness level a3 indicated by the pixel data P3. On the other hand, while the selection control signal Sd3 is at logic level 1, the data selector SL3 selects the pixel data P6 and supplies to the level shifter Ls3 the pixel data signal U3 indicating the brightness level a6 indicated by the pixel data P6.

Here, the level shifter Ls1 and the DA converter Da1 output a gradation voltage V1 having a voltage value Va1 corresponding to the brightness level a1 while the pixel data signal U1 expresses the brightness level a1. On the other hand, while the pixel data signal U1 expresses the brightness level a4, the level shifter Ls1 and the DA converter Da1 output a gradation voltage V1 having a voltage value Va4 corresponding to the brightness level a4.

Also, the level shifter Ls2 and the DA converter Da2 output a gradation voltage V2 having a voltage value Va2 corresponding to the brightness level a2 while the pixel data signal U2 expresses the brightness level a2. On the other hand, while the pixel data signal U2 expresses the brightness level a5, the level shifter Ls2 and the DA converter Da2 output a gradation voltage V2 having a voltage value Va5 corresponding to the brightness level a5.

Also, the level shifter Ls3 and the DA converter Da3 output a gradation voltage V3 having a voltage value Va3 corresponding to the brightness level a3 while the pixel data signal U3 expresses the brightness level a3. On the other hand, while the pixel data signal U3 expresses the brightness level a6, the level shifter Ls3 and the DA converter Da3 output a gradation voltage V3 having a voltage value Va6 corresponding to the brightness level a6.

Here, as shown in FIG. 8, the control circuit 120 supplies the selection control signal Sv to the voltage selector SeLL, which sequentially expresses "O" in the first interval, "1" in the second interval, "2" in the third interval, "0" in the fourth interval, "1" in the fifth interval, and "2" in the sixth interval, with 1H divided into six intervals.

Therefore, as shown in FIG. 8, in the first interval at the beginning, the voltage selector SeLL and the amplifier Ap1 output the drive signal G1 having the voltage value Va1 indicated by the gradation voltage V1 in response to the selection control signal Sv expressing "0". In the second interval of the next, the voltage selector SeLL and the amplifier Ap1 output the drive signal G1 having the voltage value Va2 indicated by the gradation voltage V2 in response to the selection control signal Sv expressing "1". In the third interval of the next, the voltage selector SeLL and the amplifier Ap1 output the drive signal G1 having the voltage value Va3 indicated by the gradation voltage V3 in response to the selection control signal Sv expressing "2". In the fourth interval of the next, the voltage selector SeLL and the amplifier Ap1 output the drive signal G1 having the voltage value Va4 indicated by the gradation voltage V1 in response to the selection control signal Sv expressing "0". In the fifth interval of the next, the voltage selector SeLL and the amplifier Ap1 output the drive signal G1 having the voltage value Va5 indicated by the gradation voltage V2 in response to the selection control signal Sv expressing "1".

In the sixth interval of the next, the voltage selector SeLL and the amplifier Ap1 output the drive signal G1 having the voltage value Va6 indicated by the gradation voltage V3 in response to the selection control signal Sv expressing "2".

In this way, the circuit block BL1 consisting of the configuration (K=6) shown in FIG. 7 generates the drive signal G1 that transmits the voltage values Va1 to Va6 corresponding respectively to the six pixel data P1 to P6 included in the image digital signal DVS by time division multiplexing within 1H, and outputs the drive signal G1 to the display panel 20.

In this case, according to the configuration shown in FIG. 7, the output delay time of each of the voltage values Va1 to Va6 expressed by the drive signal G1 accompanying the time division driving becomes, as shown in FIG. 8, the delay time DEs after the time spent on the operation of the voltage selector SeL and the amplifier Ap1 from the switching point of the value of the selection control signal Sv, thus enabling high-speed driving.

Furthermore, in the configuration shown in FIG. 7, although the hold latches Lc1 to Lc3 and the data selectors SL1 to SL3 are added for time division multiplexing of the six pixel data P1 to P6, the number of level shifters and DA converters that are originally needed is reduced from six to three (Ls1 to Ls3, Da1 to Da3) respectively.

Therefore, the circuit scale of the entire data driver 12 is significantly reduced compared to the display driver described in Patent Literature 2, and the current consumption is also significantly reduced accordingly. Furthermore, according to the configuration shown in FIG. 7, the total number of level shifters and the total number of DA converters are both reduced to ½ of the number conventionally needed. Therefore, since the instantaneous current flowing due to the simultaneous operation of the level shifters and DA converters is also significantly reduced, malfunctions associated with power supply voltage drops may be eliminated.

In essence, the data driver 12, which is a display driver according to the disclosure, includes the following circuit block (e.g., BL1) for driving a display panel (20) that includes multiple data lines (D1 to Dm) and a demultiplexer (DMX) that receives one drive signal (e.g., one of G1 to Gy) corresponding to K lines (for example, 3, 4, or 6 lines) of the data lines for each of K data lines, and sequentially supplies the one drive signal to each of the K data lines one by one for each of the K data lines. The circuit block receives multiple pixel data pieces (P1 to Pm) corresponding to each of pixels based on an image signal (DVS), and each generates, for each of the K pixel data pieces, a signal that represents each of the voltage values corresponding to the brightness levels indicated by the respective K pixel data pieces as the one drive signal by time division multiplexing.

In this case, the circuit block includes the following first multiplexer part, level shift part, digital analog conversion part, second multiplexer part, and output amplifier part.

The first multiplexer part (123) outputs first to Qth pixel data signals (e.g., U1 to U3) that represent K pixel data pieces with Q (e.g., an integer of 2 or more) signals fewer than the K pixel data pieces by time division multiplexing at least one pair of pixel data pieces consisting of two data pieces from among the K pixel data pieces. The level shift part (124) generates first to Qth high voltage pixel data signals (e.g., F1 to F3) by level shifting the amplitude of each of the first to Qth pixel data signals to a high voltage side. The digital analog conversion part (125) converts the first to Qth high voltage pixel data signals into first to Qth gradation voltages (e.g., V1 to V3) having voltage values corresponding to the brightness levels the first to Qth high voltage pixel data signals respectively express. The second multiplexer part (126) outputs, for each of horizontal scanning periods of the image signal, a gradation voltage signal (E1) that expresses, by time division multiplexing, the voltage values corresponding to the respective K pixel data pieces represented by the first to Qth gradation voltages. The output amplifier part (127) outputs a signal amplified from the gradation voltage signal as the one drive signal.

According to the display driver of the embodiment, when driving the display panel by time division driving, not only the number of output amplifiers may be reduced but also the number of level shifters and DA converters may be reduced in relation to the number of data lines of the display panel. As a result, since the instantaneous current flowing through the level shifters and DA converters can be reduced, malfunctions caused by a drop in the power supply voltage due to the instantaneous current can be avoided. Therefore, according to the display driver, reduction in the circuit scale and current consumption without causing malfunctions may be achieved.

What is claimed is:

1. A display driver for driving a display panel which comprises a plurality of data lines and a demultiplexer that receives one drive signal corresponding to K, which is an integer of 2 or more, data lines of the plurality of data lines for each of the K data lines, and sequentially supplies the one drive signal to each of the K data lines one by one for each of the K data lines, the display driver comprising:

a plurality of circuit blocks, each receiving a plurality of pixel data pieces corresponding to each of pixels based on an image signal, and each generating, for each of K pixel data pieces of the pixel data pieces, a signal representing voltage values corresponding to brightness levels indicated by the respective K pixel data pieces by time division multiplexing as the one drive signal, and each of the plurality of circuit blocks comprising a first multiplexer part that outputs first to Qth pixel data signals respectively representing the K pixel data pieces by Q, which is an integer of 2 or more, signal lines fewer than the K pixel data pieces by time division multiplexing at least one pair of pixel data pieces consisting of two data pieces among the K pixel data pieces, a level shift part that generates first to Qth high voltage pixel data signals by level shifting amplitude of the respective first to Qth pixel data signals to a high voltage side, a digital analog conversion part that converts the first to Qth high voltage pixel data signals into first to Qth gradation voltages having voltage values corresponding to brightness levels the first to Qth high voltage pixel data signals respectively represent, a second multiplexer part that outputs, for each of horizontal scanning periods of the image signal, a gradation voltage signal representing, by time division multiplexing, the voltage values corresponding to the respective K pixel data pieces represented by the first to Qth gradation voltages, and an output amplifier part that outputs a signal amplified from the gradation voltage signal as the one drive signal.

2. The display driver according to claim 1, wherein

K is 3 and Q is 2, the first multiplexer part generates a second pixel data signal representing a second pixel data piece among first to third pixel data pieces as 3 pieces of the pixel data pieces, the first multiplexer part comprises a first hold latch that latches and holds the third pixel data piece, and a data selector that receives the first pixel data piece and the third pixel data piece held in the first hold latch, outputs a signal representing the first pixel data piece as the first pixel data signal for a predetermined period from a predetermined starting point within one of the horizontal scanning periods, while outputting a signal representing the third pixel data piece held in the first hold latch as the first pixel data signal during a subsequent period following the predetermined period, the level shift part comprises a first level shifter and a second level shifter that respectively generate a first high voltage pixel data signal and a second high voltage pixel data signal by level shifting respective amplitude of the first pixel data signal and the second pixel data signal to a high voltage side, the digital analog conversion part comprises a first digital analog converter and a second digital analog converter that respectively convert the first high voltage pixel data signal and the second high voltage pixel data signal into a first gradation voltage and a second gradation voltage having voltage values corresponding to brightness levels the first high voltage pixel data signal and the second high voltage pixel data signal respectively represent, and the second multiplexer part comprises a voltage selector that receives the first gradation voltage and the second gradation voltage, outputs a signal having the first gradation voltage as the gradation voltage signal in each of a first interval and a third interval among first to third intervals dividing the one of the horizontal scanning periods into three, and outputs a signal having the second gradation voltage as the gradation voltage signal in the second interval.

3. The display driver according to claim 1, wherein

K is 4 and Q is 2, the first multiplexer part comprises a first hold latch that latches and holds a third pixel data piece among first to fourth pixel data pieces as 4 pieces of the pixel data pieces, a second hold latch that latches and holds the fourth pixel data piece, a first data selector that receives the first pixel data piece and the third pixel data piece held in the first hold latch, outputs a signal representing the first pixel data piece as the first pixel data signal for a first predetermined period from a predetermined starting point within the one of the horizontal scanning periods, while outputting a signal representing the third pixel data piece held in the first hold latch as the first pixel data signal during a subsequent period following the first predetermined period, and a second data selector that receives the second pixel data piece and the fourth pixel data piece held in the second hold latch, outputs a signal representing the second pixel data piece as the second pixel data signal for a second predetermined period from a point later than the starting point within the one of the horizontal scanning periods, while outputting a signal representing the fourth pixel data piece held in the second hold latch as the second pixel data signal during a subsequent period following the second predetermined period, the level shift part comprises a first level shifter and a second level shifter that respectively generate a first high voltage pixel data signal and a second high voltage pixel data signal by level shifting respective amplitude of the first pixel data signal and the second pixel data signal to a high voltage side, the digital analog conversion part comprises a first digital analog converter and a second digital analog converter that convert the first high voltage pixel data signal and the second high voltage pixel data signal into a first gradation voltage and a second gradation voltage having voltage values corresponding to brightness levels the first high voltage pixel data signal and the second high voltage pixel data signal respectively represent, and the second multiplexer part comprises a voltage selector that receives the first gradation voltage and the second gradation voltage, outputs a signal having the first gradation voltage as the gradation voltage signal in each of a first interval and a third interval among first to fourth intervals dividing the one of the horizontal scanning periods into four, while outputting a signal having the second gradation voltage as the gradation voltage signal in each of the second interval and the fourth interval.

4. The display driver according to claim 1, wherein

K is 6 and Q is 3, the first multiplexer part comprises a first hold latch that latches and holds a fourth pixel data piece among first to sixth pixel data pieces as 6 pieces of the pixel data pieces, a second hold latch that latches and holds the fifth pixel data piece, a third hold latch that latches and holds the sixth pixel data piece, a first data selector that receives the first pixel data piece and the fourth pixel data piece held in the first hold latch, outputs a signal representing the first pixel data piece as the first pixel data signal for a first predetermined period from a predetermined first point within the one of the horizontal scanning periods, while outputting a signal representing the fourth pixel data piece held in the first hold latch as the first pixel data signal during a subsequent period following the first predetermined period, a second data selector that receives the second pixel data piece and the fifth pixel data piece held in the second hold latch, outputs a signal representing the second pixel data piece as the second pixel data signal for a second predetermined period from a second point later than the first point within the one of the horizontal scanning periods, while outputting a signal representing the fifth pixel data piece held in the second hold latch as the second pixel data signal during a subsequent period following the second predetermined period, and a third data selector that receives the third pixel data piece and the sixth pixel data piece held in the third hold latch, outputs a signal representing the third pixel data piece as the third pixel data signal for a third predetermined period from a third point later than the second point within the one of the horizontal scanning periods, while outputting a signal representing the sixth pixel data piece held in the third hold latch as the third pixel data signal during a subsequent period following the third predetermined period, the level shift part comprises first to third level shifters that respectively generate first to third high voltage pixel data signals by level shifting respective amplitude of the first pixel data signal, the second pixel data signal, and the third pixel data signal to a high voltage side, the digital analog conversion part comprises first to third digital analog converters that convert the first to third high voltage pixel data signals into first to third gradation voltages having voltage values corresponding to brightness levels the first to third high voltage pixel data signals respectively represent, and the second multiplexer part comprises a voltage selector that receives the first to third gradation voltages, outputs a signal having the first gradation voltage as the gradation voltage signal in each of a first interval and a fourth interval among first to sixth intervals dividing the one of the horizontal scanning period into six, outputs a signal having the second gradation voltage as the gradation voltage signal in each of the second interval and the fifth interval, and outputs a signal having the third gradation voltage as the gradation voltage signal in each of the third interval and the sixth interval.

5. A display device, comprising:

a display panel, comprising a plurality of data lines and a demultiplexer that receives one drive signal corresponding to K, which is an integer of 2 or more, data lines of the plurality of data lines for each of the K data lines, and sequentially supplies the one drive signal to each of the K data lines one by one for each of the K data lines; and a display driver, driving the display panel, and the display driver comprising a plurality of circuit blocks each receiving a plurality of pixel data pieces corresponding to each of pixels based on an image signal, and each generating, for each of K pixel data pieces of the pixel data pieces, a signal representing voltage values corresponding to brightness levels indicated by the respective K pixel data pieces by time division multiplexing as the one drive signal, each of the plurality of circuit blocks comprising a first multiplexer part that outputs first to Qth pixel data signals respectively representing the K pixel data pieces by Q, which is an integer of 2 or more, signal lines fewer than the K pixel data pieces by time division multiplexing at least one pair of pixel data pieces consisting of two data pieces among the K pixel data pieces, a level shift part that generates first to Qth high voltage pixel data signals by level shifting amplitude of the respective first to Qth pixel data signals to a high voltage side, a digital analog conversion part that converts the first to Qth high voltage pixel data signals into first to Qth gradation voltages having voltage values corresponding to brightness levels the first to Qth high voltage pixel data signals respectively represent, a second multiplexer part that outputs, for each of horizontal scanning periods of the image signal, a gradation voltage signal representing, by time division multiplexing, the voltage values corresponding to the respective K pixel data pieces represented by the first to Qth gradation voltages, and an output amplifier part that outputs a signal amplified from the gradation voltage signal as the one drive signal.

* * * * *